(12) United States Patent
Hirano et al.

(10) Patent No.: US 7,775,697 B2
(45) Date of Patent: Aug. 17, 2010

(54) VEHICULAR LAMP

(75) Inventors: Junichi Hirano, Shizuoka (JP); Kazunori Natsume, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/400,466

(22) Filed: Mar. 9, 2009

(65) Prior Publication Data

US 2009/0225562 A1 Sep. 10, 2009

(30) Foreign Application Priority Data

Mar. 10, 2008 (JP) ............................. 2008-060105

(51) Int. Cl.
*F21V 9/00* (2006.01)
*F21V 1/00* (2006.01)

(52) U.S. Cl. .................. 362/511; 362/509; 362/540; 362/545

(58) Field of Classification Search ................ 362/551, 362/556, 555, 554, 540, 541, 542, 544, 509, 362/498, 499, 511
See application file for complete search history.

(56) References Cited

U.S. PATENT DOCUMENTS

| | | | | |
|---|---|---|---|---|
| 6,102,559 A | * | 8/2000 | Nold et al. | 362/558 |
| 6,299,334 B1 | * | 10/2001 | Schwanz et al. | 362/511 |
| 6,769,798 B2 | * | 8/2004 | Mishimagi | 362/522 |
| 6,910,783 B2 | * | 6/2005 | Mezei et al. | 362/615 |
| 6,955,459 B2 | * | 10/2005 | Mochizuki et al. | 362/602 |
| 7,695,175 B2 | * | 4/2010 | Futami | 362/511 |
| 2002/0131275 A1 | * | 9/2002 | Yamamoto et al. | 362/555 |
| 2006/0067084 A1 | * | 3/2006 | Stefanov | 362/511 |
| 2009/0046220 A1 | * | 2/2009 | Tsuchiya et al. | 349/65 |
| 2009/0225562 A1 | * | 9/2009 | Hirano et al. | 362/516 |

FOREIGN PATENT DOCUMENTS

JP 03-103503 U 10/1991

* cited by examiner

*Primary Examiner*—Jacob Y Choi
(74) *Attorney, Agent, or Firm*—Osha • Liang LLP

(57) ABSTRACT

A vehicular lamp includes a light source positioned inside a lamp chamber. The lamp chamber is formed from a lamp body fixed to a vehicle body and a front cover that covers a front open portion thereof. The vehicular lamp includes a light guide that includes a side end surface to which light emitted from the light source is incident on one side thereof; a light-emitting surface that emits the light that is incident from the side end surface in a predetermined direction; and a reflective back surface that has a reflecting portion that faces the light-emitting surface. The light guide made from translucent material that is positioned on one side inside the light chamber following along with the shape of the lamp front cover. A plurality of stippling steps that have a generally conical shape are provided on the reflective back surface of the light guide. A central axis that passes through an apex angle of every stippling step slants toward the predetermined emission direction of the light with respect to a virtual vertical line perpendicular to the reflective back surface.

14 Claims, 4 Drawing Sheets

VEHICULAR LAMP

BACKGROUND OF INVENTION

1. Field of the Invention

The present invention relates to a vehicular lamp that includes a light guide, which is made from a translucent material and emits, in a predetermined direction, light that is emitted from a light source and is incident to the light guide.

2. Related Art

As an example of a conventional vehicular lamp, a vehicular lamp that includes a light guide with one end surface that faces a light source and that has a light incident surface is known (see Patent Document 1 for example).

In the vehicular lamp disclosed in Patent Document 1, the light emitted by a turn signal lamp is incident to the light guide from the light incident surface and is lead to a terminal side of the side space. The light strikes the stippling steps and is reflected. Then, the reflected light is emitted outside from the surface of the light guide. Thus, the side surface illumination portion of the front cover is radiated to equalize the illumination of the entire front cover.

[Patent Document 1] Published utility model publication No. 3-103503

SUMMARY OF INVENTION

However, for the vehicular lamp disclosed in Patent Document 1, if the light guide has large curvature then the reflected light that strikes the stippling steps and is reflected is dispersed in the direction of radiation from the light guide. As a result, it is difficult to make the light guide emit light equally. In addition, it may not meet the requirements of the light distribution regulations for directivity to the front and rear of the vehicle.

Therefore, embodiments of the present invention provide a vehicular lamp that can equalize the light emitted from a light guide and also control the directivity of this emitted light.

One or more embodiments of the present invention involve a vehicular lamp wherein, a light source is positioned inside a lamp chamber formed from a lamp body that is fixed to the vehicle body and a front cover that covers a front open portion thereof. The vehicular lamp has a light guide that includes a side end surface to which the light emitted from the light source is incident on one side thereof, a light-emitting surface that emits the light that is incident from the side end surface in a predetermined direction, and a reflective back surface that has a reflecting portion that faces the light-emitting surface. The light guide is made from translucent material that is positioned on one side inside the light chamber following along with the shape of the lamp front cover. The vehicular lamp is characterized in that a plurality of stippling steps that have a generally conical shape are provided on the reflective back surface of the light guide and a central axis that passes through an apex angle of every stippling step slants toward the predetermined emission direction of the light with respect to a virtual vertical line perpendicular to the reflective back surface.

According to the vehicular lamp with the structure described above, the central axis that passes through the apex angle of every stippling step is slanted toward the predetermined emission direction of the light with respect to the virtual vertical line perpendicular to the reflective back surface. Therefore, the light emitted from the light source is incident from the side end surface of the light guide and is reflected by a plurality of stippling steps. After that, such light is given directivity from the light-emitting surface of the light guide and is emitted toward the predetermined direction. Thus, even if the light guide has large curvature, the light distribution regulations that require directivity toward the front or rear of the vehicle can be satisfied. In addition, the light guide is equally emitted within the range to satisfy the light distribution regulations and the directivity of light can also be controlled.

Furthermore, in the vehicular lamp with the structure described above, an introduction width of the light is formed between the light-emitting surface and the reflective back surface. The introduction width is equal to the thickness dimension of the light guide, which is the distance between the light-emitting surface and the reflective back surface, minus the height dimensions of the stippling steps, and is set to 90% or more of the thickness dimension of the light guide.

According to the structure described above, the introduction width of the light is equal to the thickness dimension of the light guide minus the height dimension of the stippling steps and is set to 90% or more of the thickness dimension of the light guide. Accordingly, the light that is emitted from the light source can be introduced efficiently.

Furthermore, in a vehicular lamp with the structure described above, the light guide has a tapered such that the distance between the light-emitting surface and the reflective back surface becomes gradually more narrow shape from the side end surface on the light source side toward the other end side.

According to a vehicular lamp with the structure described above, the light guide has a tapered shape such that the distance between the light-emitting surface and the reflective back surface gradually becomes more narrow from the side end surface on the light source side toward the other end surface. Thus, even if the light guide has large curvature, the distance from the stippling steps to the light-emitting surface becomes smaller. Consequently, the reflection angle of the introduced light is adjusted. As a result, the light from the light-emitting surface can be emitted unfailingly in the predetermined direction.

Furthermore, in a vehicular lamp with the structure described above, the placement density of the stippling steps increases in proportion to the distance from the side end surface.

According to a vehicular lamp with the structure described above, the placement density of the stippling steps increases in proportion to the distance from the side end surface. Therefore, even if the light guide has large curvature, the amount of light reflected by the stippling steps is adjusted even at the end side that is far from the side end surface. Accordingly, the brightness of the light can be maintained at a level that is equal to that at the side end surface.

According to the vehicular lamp embodiments of the present invention, the light emitted from the light guide can be equalized and the directivity of the emitted light can also be controlled.

Other aspects and advantages of the invention will be apparent from the following description, the drawings and the claims.

DETAILED DESCRIPTION

Embodiments of the present invention will be described below with reference to the drawings.

Figure 1:
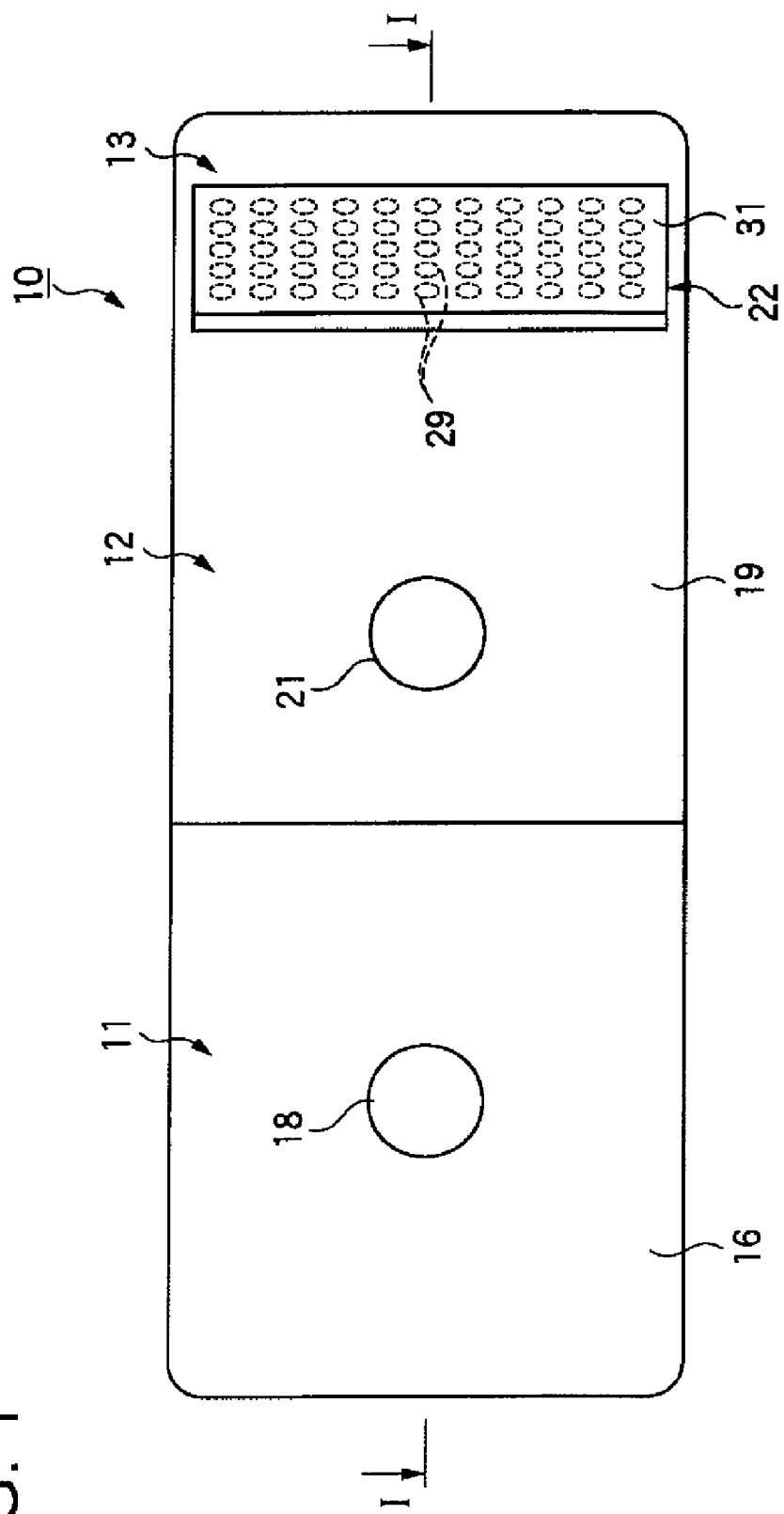
FIG. 1 is a frontal view showing a vehicular lamp according to an embodiment of the present invention.
Figure 2:
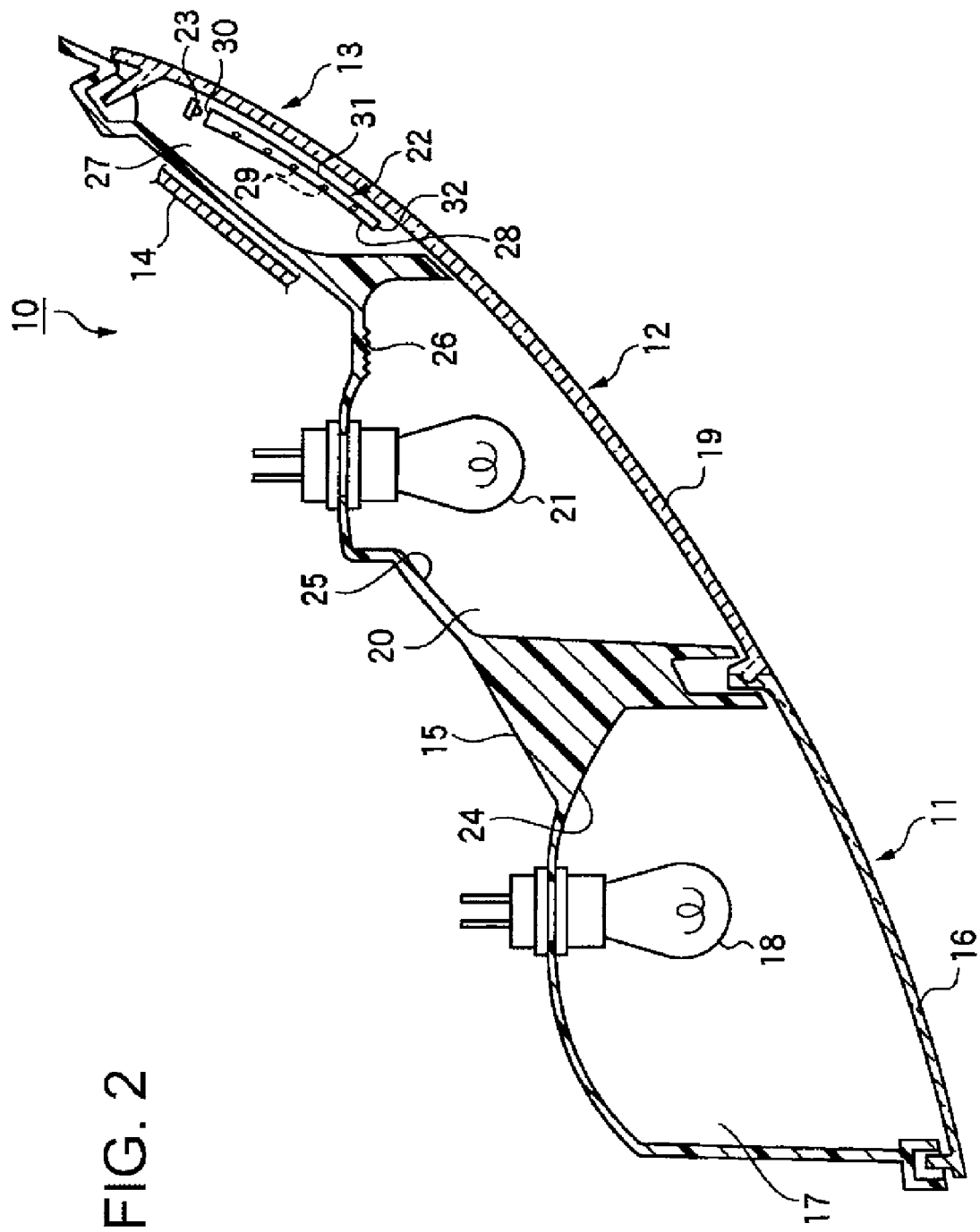
FIG. 2 is a cross-sectional view along the I-I line in FIG. 1.
Figure 3:
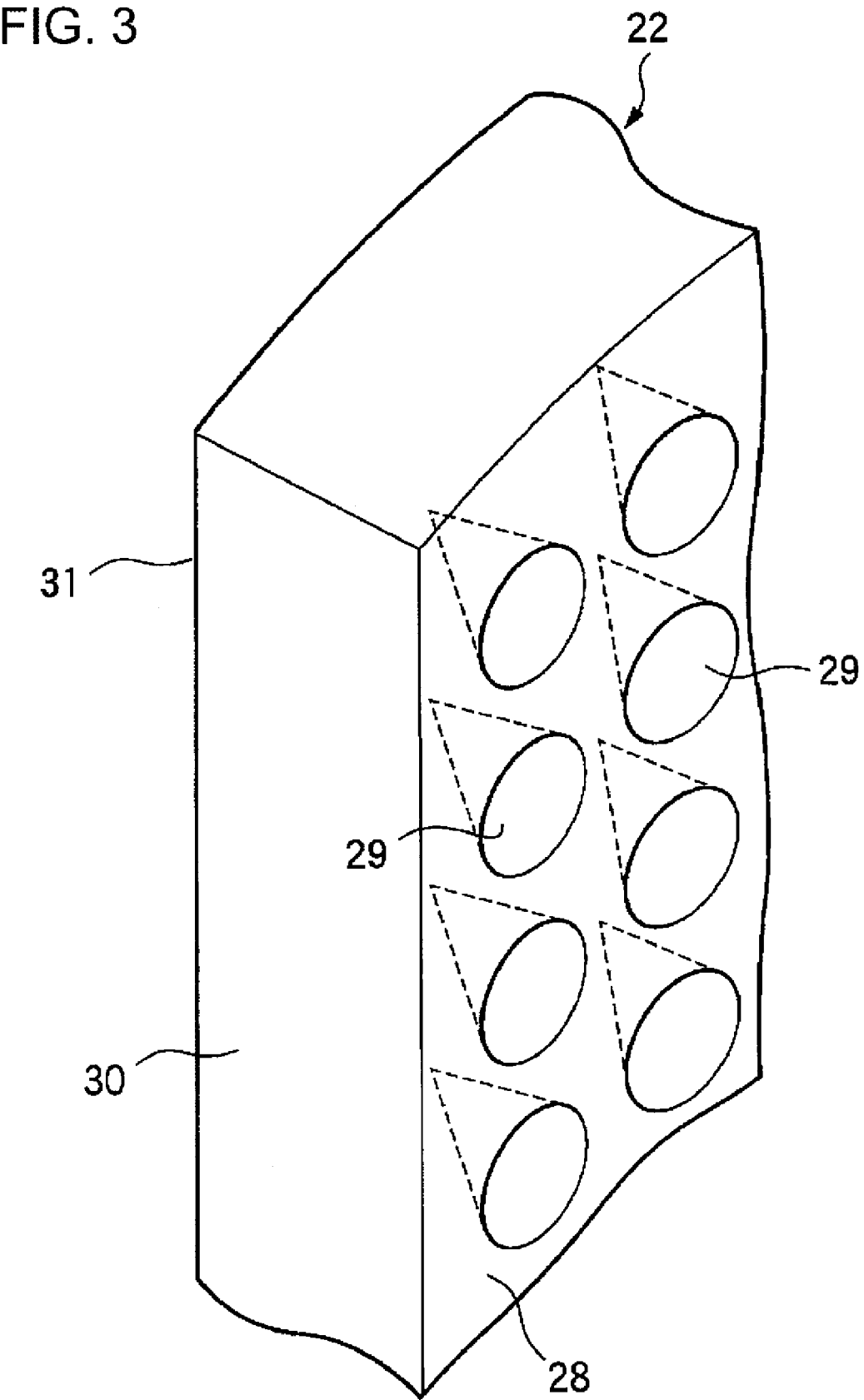
FIG. 3 is a perspective view of the exterior appearance of a broken-out portion of a light guide applied to the vehicular lamp in FIG. 1 as seen from the internal surface side.
Figure 4:
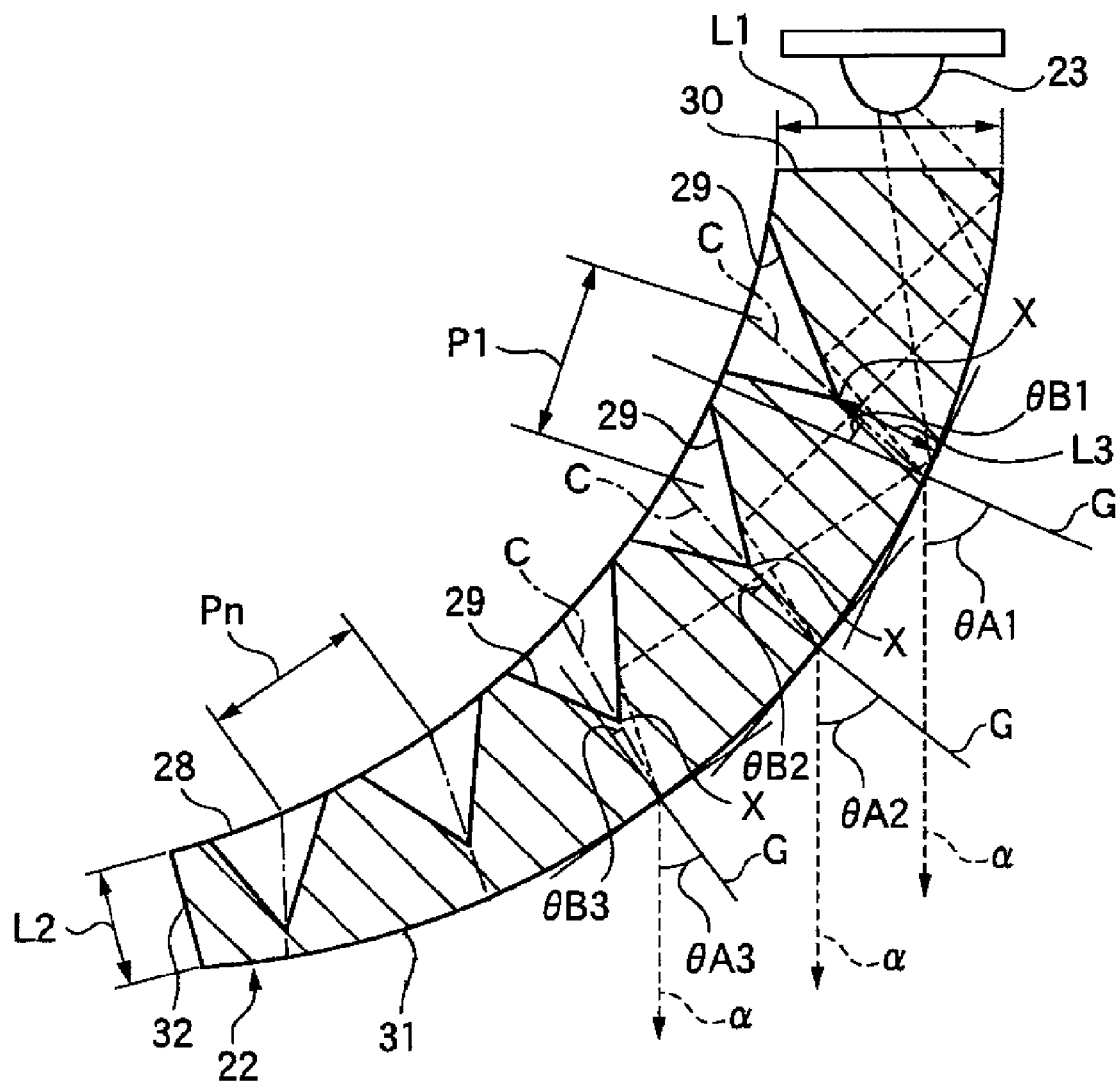
FIG. 4 is a horizontal cross-sectional view explaining the light paths within the light guide shown in FIG. 3.

FIGS. 1 to 4 show an embodiment of a vehicular lamp according to the present invention. FIG. 1 is a frontal view of the vehicular lamp according to an embodiment of the present invention. FIG. 2 is a cross-sectional view along the I-I line in FIG. 1. FIG. 3 is a perspective view of the exterior appearance of a broken-out portion of a light guide applied to the vehicular lamp in FIG. 1 as seen from the internal surface side. FIG. 4 is a horizontal cross-sectional view explaining the light paths within the light guide shown in FIG. 3. Note that, the front, rear, left, and right directions in this explanation are based on the direction of the vehicle. In FIG. 2 the bottom side is the rear of the vehicle.

As shown in FIG. 1, a vehicular lamp 10, which is an embodiment of the present invention, is a rear combination lamp that includes, a stop lamp unit 11, a turning signal unit 12, and a tail lamp unit 13, arranged in order from the center of the vehicle body to the side portion of the vehicle body.

As shown in FIG. 2, a vehicular lamp 10 includes a lamp body 15 that is open toward the rear side of the vehicle body, is made of resin, and is fixed to a body panel 14.

The stop lamp unit 11 includes, a stop lamp front cover 16, which is made of translucent resin and is attached to the open portion of the lamp body 15 on the rear side of the vehicle body, a first lamp chamber 17, which is defined by the lamp body 15 and the stop lamp front cover 16, and an incandescent bulb 18, which is the light source and attached inside the first lamp chamber 17.

The turn signal lamp unit 12 includes, a turn signal lamp front cover 19, which is made of translucent resin and is attached to the vehicle body rear open portion of the lamp body 15, a second lamp chamber 20, which is defined by the lamp body 15 and the turn signal lamp front cover 19, and an incandescent bulb 21, which is the light source and attached inside the second lamp chamber 20.

The tail lamp unit 13 includes, a third lamp chamber 27, which is defined by the lamp body 15 and the turn signal lamp front cover 19 that is shared with the turn signal lamp unit 12, a light guide 22, which is attached along the turn signal lamp front cover 19 side of the third lamp chamber 27, and a light emitting element (LED) 23, which is the light source and attached to the side end portion of the third lamp chamber 27. The light source may be an incandescent bulb or other electric bulb instead of the LED 23. By adopting the LED 23 as the light source it is not necessary to consider the heat resistance and, therefore, it becomes possible to expand the applicable scope of the materials selected for the light guide 22.

The lamp body 15 includes a hemispherical-shaped stop lamp reflector 24, which is located inside of the first lamp chamber 17. In addition, the lamp body 15 also includes a similarly hemispherical-shaped turn signal lamp reflector 25, which is located inside of the second lamp chamber 20. The turn signal lamp reflector 25 includes a secondary reflector 26, which is hemispherical-shaped and is formed by a plurality of convex-concave surfaces outside the vehicle body.

The light guide 22 is made from translucent materials such as acrylic resin, polycarbonate resin, or epoxy resin. The light guide 22 has a plate-like shape that follows along with the shape of the turn signal lamp front cover 19 and is curved at the same curvature as the turn signal lamp front cover 19. The light guide 22 includes an incident surface 30, which is a side end surface on one end of the light guide 22 and to which the light emitted from the LED 23 is incident, an exterior surface 31, which is a light-emitting surface that emits the incident light in a predetermined direction, and an interior surface 28, which is a reflective back surface that has a reflecting portion that faces the light-emitting surface. Furthermore, a plurality of stippling steps 29 are provided as depressions on the interior surface 28 side.

The light guide 22 has a rectangular shape when viewed from the front (see FIG. 1). The light guide 22 is formed in a tapered shape such that the distance between the interior surface 28 and the exterior surface 31, the thickness dimension, gradually becomes more narrow from the incident surface 30 on one end side toward the other end side of the light guide 22. Because the LED 23 is assembled on the incident surface 30 side of the light guide 22, the emitted light incident from the incident surface 30 is radiated in the predetermined direction from the exterior surface 31, which is the light-emitting surface, with such light also controlled by the plurality of the stippling steps 29 at the same time.

As shown in FIG. 3, the stippling steps 29 in the light guide 22 have a conical shape and are formed in depressions from the interior surface 28 toward the rear of the vehicle body. A plurality of stippling steps 29 are arranged in rows in both the horizontal and vertical directions. The depth dimensions of the stippling steps 29 are, for example, between 0.5 mm and 1.0 mm. Note that, the height dimensions of the stippling steps 29 may not all be equal.

As shown in FIG. 4, on the light guide 22, the width dimension L1 of the incident surface 30 on one end side thereof is, for example, set to 8.0 mm, and the width dimension L2 of the other end surface 32 on the other end side thereof is, for example, set to 2.0 mm. Note that, the light guide 22 may have a different curvature from the turn signal lamp front cover 19, instead of a generally equal curvature to that of the turn signal lamp front cover 19. In addition, the curvature of the interior surface 28 may be different from the curvature of the exterior surface 31. Furthermore, the incident surface 30 may be attached to a separate part from the light guide 22 in an integrated manner.

Furthermore, on the light guide 22, the introduction width L3, which introduces the emitted light that is emitted from the LED 23 that is positioned in vicinity of the incident surface 30, is equal to the thickness dimension L1, which is the distance between the interior surface 28 and the exterior surface 31, minus the height dimensions of the stippling steps 29. The introduction width L3 is set to 90% or more of the thickness dimension L1.

On the light guide 22, the pitch P1 between the stippling steps 29 that are adjacent to each other on the incident surface 30 side of the light guide 22 is set, for example, to 1.5 mm, while the pitch Pn between the stippling steps 29 that are adjacent to each other on the other end surface 32 side is set, for example, to 0.5 mm. Consequently, from the incident surface 30 side to the other end surface 32 side the placement density of the stippling steps 29 increases in proportion to the distance from the incident surface 30.

On the light guide 22, the slope angles θB1, θB2, θB3 . . . are set such that a central axis (center line) C which passes through an apex angle X of every stippling step 29 slants toward a light emission direction α with respect to a virtual vertical line G perpendicular to the interior surface 28. The slope angles θB1, θB2, θB3 . . . are also set so as to become smaller from the incident surface 30 side toward the other end surface 32 side. In other words, the slope angles θA1, θA2, θA3 . . . formed by virtual vertical line G on the exterior surface 31 side and the light emission direction α are set so as to become smaller from the incident surface 30 side toward the other end surface 32 side. The apex angle X can be selected, for example, from between 78 and 80 degrees.

Furthermore, on light guide 22, the relationship between slope angles θA (θA1, θA2, θA3 . . . ) and slope angles θB (θB1, θB2, θB3 . . . ) described above is set according to the following formula 1, where nA indicates the index of refraction of the air and nB indicates the index of refraction of the light guide material.

$$\theta B = \text{Sin}^{-1}((nA \, \text{Sin} \, \theta A)/nB) \qquad \text{[Formula 1]}$$

In the vehicular lamp 10, when the lighting switch (not shown) is turned ON then the LED 23 of the tail lamp 13 (see FIG. 1) is emitted. When the LED 23 is emitted, the emitted light is incident to the light guide 22 through the incident surface 30 of the light guide 22. Then, the incident light is totally reflected by the internal side of external surface 31 of the light guide 22 and the internal side of the internal surface 28 thereof. After this, the light is totally reflected by the slope faces of the stippling steps 29.

The central axis (center line) C, which passes through the apex angle X of every stippling step 29, is set to slant toward the light emission direction α with respect to the virtual vertical line G perpendicular to the interior surface 28 by the slope angles θB1, θB2, θB3 . . . . Furthermore, the slope angles θA1, θA2, θA3 . . . formed by the virtual vertical line G on the exterior surface 31 side and the light emission direction α are set so as to become smaller from the incident surface 30 side toward the other end surface 32 side. Thus, the light reflected by every stippling step 29 is given directivity by the exterior surface 31 and is emitted rearward of the vehicle body in predetermined emission direction α.

When the brake pedal (not shown) is depressed, the incandescent bulb 18 in the stop lamp unit 11 (see FIG. 1) is lit. The light from the incandescent bulb 18 passes through the stop lamp front cover 16 and is emitted. The stop lamp reflector 24 (see FIG. 2) also reflects this light and the operating state of the brake pedal is displayed.

When the turn signal switch (not shown) is turned ON for the right side, then the incandescent bulb 21 in the turn signal lamp unit 12 (see FIG. 1) starts flashing. Accordingly, the light from the incandescent bulb 21 passes through the turn signal lamp front cover 19 and is emitted. The turn signal lamp reflector 25 and the secondary reflector 26 (see FIG. 2) also reflect this light and the change of course of the vehicle is displayed.

Hereinafter, embodiments for carrying out the operational effects of the vehicular lamp 10 according to the present invention are described.

In one or more embodiments, a light guide that includes the same stippling steps as a conventional light guide is used as a comparative example. A light distribution simulation measurement was carried out in order to investigate the efficiency of emitted light flux toward the previously determined CLL regulation range. For measurement, a commercially available white LED is used.

Consequently, it was two times the amount of light in comparison to the light distribution regulation "ECE Reg. 7 POSITION LIGHT". Furthermore, in the embodiment shown, the efficiency was 0.05, which was 5 times greater than the efficiency of the conventional stippling step at 0.01.

Note that, the efficiency referred to here is equal to the amount of light emitted (in candela, "cd") divided by the amount of light injected (cd).

The central axis (center line) C, which passes through the apex angle X of every stippling step 29, is set to slant toward the light emission direction α with respect to the virtual vertical line G perpendicular to the interior surface 28 by the slope angles θB1, θB2, θB3 . . . and the slope angles θA1, θA2, θA3 . . . formed by the virtual vertical line G on the exterior surface 31 side and the light emission direction α are set so as to become smaller from the incident surface 30 side toward the other end surface 32 side. Thus, it was found that the light reflected by every stippling step 29 is given directivity by the exterior surface 31 and is emitted as generally parallel light toward the rear of the vehicle body.

As explained above, according to the vehicular lamp 10 of the shown embodiment, the stippling steps 29 that have a generally conical shape are provided on the interior surface 28 of the light guide 22. The central axis C, which passes through the apex angle X of every stippling step 29, slants toward the light emission direction α with respect to every virtual vertical line G perpendicular to the interior surface 28 of the light guide 22. Therefore, the light emitted from LED 23 is given directivity by the exterior surface 31 of the light guide 22 after being reflected by the plurality of stippling steps 29 and is emitted in the same direction. Thus, even in the case that the light guide 22 has large curvature, the light distribution regulations that require directivity toward the rear of the vehicle body can be satisfied. While the light guide 22 emits light equally within the range to satisfy the light distribution regulations, the directivity of light that is emitted from the light guide 22 can be controlled.

Furthermore, on the light guide 22, the introduction width L3, which introduces the light that is emitted from the LED 23 that is positioned in vicinity of the incident surface 30, is equal to the thickness dimension L1, the distance between the interior surface 28 and the exterior surface 31, minus the height dimensions of the stippling steps 29. In addition, the introduction width L3 is set to 90% or more of the thickness dimension L1. Therefore, the light that is emitted from the LED 23 can be introduced efficiently.

In addition, the stippling steps 29 are depressions formed into a generally conical shape in the interior surface 28 of the light guide 22. Therefore, the stippling steps 29 are easy to be formed and also do not produce a lot of waste material. This makes it possible to improve the productivity.

Furthermore, in the stippling steps 29, the slope angles θA1, θA2, θA3 . . . formed by the virtual vertical line G on the exterior surface 31 side and the light emission direction α are set so as to become smaller from the incident surface 30 side toward the other end surface 32 side. Therefore, even if the light guide 22 has large curvature, the light emitted from the exterior surface 31 can be given directivity and be emitted in the same direction.

In addition, because light guide 22 is formed in a tapered shape such that the distance between the interior surface 28 and the exterior surface 31, the thickness dimension, gradually becomes more narrow from the incident surface 30 on one end side toward the other end side of the light guide 22. Therefore, even if the light guide 22 has large curvature, the distance from the stippling steps 29 to the exterior surface 31 becomes smaller from the incident surface 30 toward the other end surface 32 side. As a result, the reflection angle of the introduced light is adjusted and the emitted light can be emitted unfailingly in the same direction.

Furthermore, the placement density of the stippling steps 29 increases from the incident surface 30 side toward the other end surface 32 side. Therefore, even if the light guide 22 has large curvature, the reflection angle of light introduced is adjusted even on the other end surface 32 side and it is possible to unfailingly give the emitted light directivity.

The present invention is not limited to the embodiments described above and can be freely adapted, altered, and improved, etc. In addition, the structural elements used in the embodiments described above are not limited in terms of material, shape, dimension, value, form, number, layout, or the like, provided that any structural elements used are capable of achieving one or more aspects of the present invention.

For example, the number of stippling steps and placement thereof, or the like, are not limited to the examples shown in the figures. Any number of stippling steps and any number of rows can be selected and applied, as appropriate. Furthermore, although the exemplary vehicular lamp was described as a rear combination lamp, of course, it can instead be adapted to a front combination lamp or the like.

Accordingly, while description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

10 VEHICULAR LAMP
11 STOP LAMP UNIT
22 LIGHT GUIDE
23 LED (LIGHT SOURCE, LIGHT-EMITTING ELEMENT)
28 INTERNAL SURFACE (REFLECTIVE BACK SURFACE)
29 STIPPLING STEPS
30 INCIDENT SURFACE (SIDE END SURFACE)
31 EXTERIOR SURFACE (LIGHT-EMITTING SURFACE)

What is claimed is:

1. A vehicular lamp comprising:
   a lamp body having an open portion;
   a lamp front cover that covers the open portion so as to form a lamp chamber;
   a light source disposed inside the lamp chamber;
   a light guide disposed inside the lamp chamber and positioned on one side inside the lamp chamber following along with a shape of the lamp front cover,
   the light guide comprising:
      a side end surface to which light emitted from the light source is incident on one side thereof;
      a light-emitting surface that emits the light that is incident from the side end surface in a predetermined direction;
      a reflective back surface comprising a reflecting portion facing the light-emitting surface; and
      a plurality of stippling steps having a generally conical shape disposed on the reflective back surface,
   wherein a central axis that passes through an apex angle of every stippling step slants toward the predetermined emission direction of the light with respect to a virtual vertical line perpendicular to the reflective back surface.

2. The vehicular lamp according to claim 1,
   wherein an introduction width of the light guide, which introduces the emitted light that is incident from the side end surface, is set to 90% or more of a thickness dimension of the light guide,
   wherein the thickness dimension of the light guide is a distance between the light-emitting surface and the reflective back surface, minus height dimensions of the stippling steps.

3. The vehicular lamp according to claim 1, wherein the light guide has a tapered shape such that a distance between the light-emitting surface and the reflective back surface becomes gradually more narrow from the side end surface on the light source side toward the other end side.

4. The vehicular lamp according to claim 1, wherein placement density of the stippling steps increases in proportion to a distance from the side end surface.

5. The vehicular lamp according to claim 2, wherein the light guide has a tapered shape such that a distance between the light-emitting surface and the reflective back surface becomes gradually more narrow from the side end surface on the light source side toward the other end side.

6. The vehicular lamp according to claim 2, wherein placement density of the stippling steps increases in proportion to a distance from the side end surface.

7. The vehicular lamp according to claim 3, wherein placement density of the stippling steps increases in proportion to a distance from the side end surface.

8. A vehicular lamp comprising:
   a light source positioned inside a lamp chamber,
   wherein the lamp chamber is formed from:
      a lamp body fixed to a vehicle body, and
      a front cover that covers a front open portion thereof;
   a light guide that includes a side end surface to which light emitted from the light source is incident on one side thereof;
   a light-emitting surface that emits the light that is incident from the side end surface in a predetermined direction; and
   a reflective back surface that has a reflecting portion that faces the light-emitting surface,
   wherein the light guide is made from translucent material,
   wherein the light guide is positioned on one side inside the lamp chamber following along with a shape of the lamp front cover,
   wherein a plurality of stippling steps that have a generally conical shape are provided on the reflective back surface of the light guide, and
   wherein a central axis that passes through an apex angle of every stippling step slants toward the predetermined emission direction of the light with respect to a virtual vertical line perpendicular to the reflective back surface.

9. The vehicular lamp according to claim 8,
   wherein an introduction width of the light guide, which introduces the emitted light that is incident from the side end surface, is set to 90% or more of a thickness dimension of the light guide, wherein the thickness dimension of the light guide is a distance between the light-emitting surface and the reflective back surface, minus height dimensions of the stippling steps.

10. The vehicular lamp according to claim 8, wherein the light guide has a tapered shape such that a distance between the light-emitting surface and the reflective back surface becomes gradually more narrow from the side end surface on the light source side toward the other end side.

11. The vehicular lamp according to claim 8, wherein placement density of the stippling steps increases in proportion to a distance from the side end surface.

12. The vehicular lamp according to claim 9, wherein the light guide has a tapered shape such that a distance between the light-emitting surface and the reflective back surface becomes gradually more narrow from the side end surface on the light source side toward the other end side.

13. The vehicular lamp according to claim 9, wherein placement density of the stippling steps increases in proportion to a distance from the side end surface.

14. The vehicular lamp according to claim 10, wherein placement density of the stippling steps increases in proportion to a distance from the side end surface.

* * * * *